United States Patent [19]

Miura et al.

[11] Patent Number: 4,723,791
[45] Date of Patent: Feb. 9, 1988

[54] SUSPENSION OF VEHICLE

[75] Inventors: Kiyokatsu Miura, Gamagori; Nobuo Hiraiwa, Toyota; Hajime Naruse, Toyota; Shogo Tanaka, Toyota; Hisaomi Kumai, Gotemba; Mitsuo Kawase; Naoto Kitagawa, both of Toyota, all of Japan

[73] Assignee: Toyota Jidosha Kabushiki Kaisha, Toyota, Japan

[21] Appl. No.: 921,125

[22] Filed: Oct. 21, 1986

[30] Foreign Application Priority Data

Oct. 21, 1985 [JP] Japan .................................. 60-233490
Oct. 22, 1985 [JP] Japan .......................... 60-161831[U]

[51] Int. Cl.$^4$ ............................................. B60G 11/22
[52] U.S. Cl. .................................... 280/716; 180/312;
180/11; 267/257; 267/292; 280/671
[58] Field of Search .............. 280/666, 688, 724, 716,
280/690, 710, 701, 697, 671; 180/11, 312;
267/21 R, 63 R

[56] References Cited

U.S. PATENT DOCUMENTS 3,822,893  7/1974  Huber ................................... 280/716
3,831,967  8/1974  Uhlenhaut et al. ................... 280/666
3,891,232  6/1975  Flemming ........................... 280/701
3,913,696  10/1975 Kennedy et al. .................... 280/697
4,474,389  10/1984 von der Ohe ....................... 280/701
4,526,400  7/1985  Kijima et al. ....................... 280/690

FOREIGN PATENT DOCUMENTS 55-155605  4/1979  Japan .
5670408   11/1979  Japan .
59-9926    3/1984  Japan .
59-19240  12/1984  Japan .

Primary Examiner—John J. Love
Assistant Examiner—Kenneth R. Rice
Attorney, Agent, or Firm—Oblon, Fisher, Spivak, McClelland & Maier

[57]  ABSTRACT

A suspension of a vehicle includes a set of suspension arms each supporting a wheel, a subframe pivotably connected on its left and right sides with the respective suspension arms, the subframe having on its each side portions forward and rearward of a rotary axis of the wheel and six elastic mounts. The subframe is coupled on each side thereof with a car body through two of the elastic mounts disposed at lateral interval in one of the portion and one elastic mount disposed in the other of the portions.

15 Claims, 10 Drawing Figures

SUSPENSION OF VEHICLE

BACKGROUND OF THE INVENTION

1. Field of the Invention

This invention relates to a suspension of a vehicle, and more particularly to a suspension of a vehicle including a subframe in which suspension arms each supporting a wheel are pivotably connected to the left and right sides respectively.

2. Description of the Prior Art

A vehicle, in which suspension arms each supporting a wheel are connected pivotably to the left and right sides of a subframe respectively and the subframe is coupled with a car body through rubber mounts, can advantageously simplify assembling operation on a vehicle assembling line, easily ensure the accuracy of assemblage and facilitate interruption of load noise, as compared with a vehicle coupled the suspension arms directly with the car body. On the other hand, since front and rear compliance for ride comfort lateral force rigidity for controllability and vertical softness for preventing vibration depend upon the property of the rubber mounts disposed on connections of the subframe and the car body, shape, location, hardness and other features of the rubber mounts have been variously improved.

In the suspension disclosed in Japanese Utility Model Public Disclosure (KOKAI) No. 155605/80, support portions at two front left and right locations of a suspension member, i.e., a subframe are mounted on a car body through respective elastic bodies such that the subframe can move forward, backward, leftward and rightward, and a support portion at a rear central spot is mounted on the car body through an elastic body such that the subframe can move only forward and backward.

In a suspension disclosed in Japanese Utility Model Public Disclosure (KOKAI) No. 70408/81, a front mount member and a rear mount member, i.e., a subframe are coupled to a car body through four rubber mounts disposed in the front, rear, left and right and constituted such that the distance between a rotary axis of a wheel and the front rubber mount is different from that between the rotary axis and the rear rubber mount.

In a suspension system disclosed in Japanese Utility Model Publication No. 9926/84, a subframe is constituted from cross members disposed respectively in the front and rear and a mount member disposed in front of the front cross member and coupled with a car body at the left and right ends through rubber mounts. The respective inner ends of a pair of suspension arms are coupled with the cross members and the front and rear portions of a differential carrier are respectively coupled with the mount member and the rear cross member through rubber mounts.

In the suspensions disclosed in said Japanese Utility Model Public Disclosures, each subframe is coupled with the car body through the total four rubber mounts disposed at front and rear portions of the respective sides of subframe, or through the total three rubber mounts disposed at the respective front sides and rear central portion of the subframe, so that the front and rear compliance and the steering property in the action of lateral force are determined after the shape and spring constant of these rubber mounts are determined and the rubber mounts are incorporated in predetermined positions.

SUMMARY OF THE INVENTION

Since the rear rubber mount is generally formed hard in the lateral direction, ranges of selecting the spring constant and incorporating direction of the rear rubber mount are limited, and since the incorporating direction of the front rubber mount is restricted by the rear rubber mount, the front and rear or the longitudinal compliance and the steering property in the action of lateral force are limited in the degree of setting freedom.

An object of the present invention is to provide a suspension of a vehicle which can expand the degree of setting freedom of a longitudinal compliance and a steering property in the action of lateral force and improve ride comfort and controllability.

Now, in a suspension provided with a strut bar or a radius rod for restricting the forward and backward movement of a wheel carrier, one end of the strut bar may be coupled with a subframe in order to raise further the effect of simplifying the assembling operation by provision of the subframe (for example, Japanese Utility Model Public Disclosure (KOKAI) No. 134309/82 and No. 192407/84). In this case, since the longitudinal force transmitted to the subframe through the strut bar is large, the rigidity of connection of the subframe to the strut bar and the surrounding thereof needs to be increased and this provides an obstacle to the lightening of the subframe.

A different object of the present invention is to provide a suspension of a vehicle which can transmit the longitudinal force directly to the car body transmitted through the strut bar.

According to the present invention, there is provided a suspension of a vehicle which comprises a set of suspension arms each supporting a wheel, a subframe pivotably connected on its left and right sides with said respective suspension arms, the subframe having on its each side portions forward and rearward of a rotary axis of said wheel and a plurality of elastic mounts.

The subframe is coupled on each side thereof with a car body through at least two of said elastic mounts disposed at lateral interval in one of said portions and at least one elastic mount disposed in the other of said portions. In another embodiment, said subframe is coupled on each side thereof with a car body through at least two of said elastic mounts disposed at lateral interval in one of said portions, and said subframe is further coupled at a lateral center thereof with the car body through at least one elastic mount disposed in the other of said portions.

When the suspension further comprises a strut bar disposed on each side of the car body, one end of the strut bar is connected to the suspension arm or a wheel carrier and the other end of said strut bar is connected to a mounting portion to which is attached an inside one of said two elastic mounts disposed at the each side of said subframe.

The shape, spring constant, degree of non-linearity, etc. of two first and second elastic mounts at the respective sides are selected with some degrees of freedom in consideration of mutual relationship between the first and second elastic mounts even if those of one third elastic mount are same as those of prior one. For example, any selection within a considerable range is achieved such that the spring constant of one of the first and second elastic mounts is formed so as to be larger than that of the other or the degree of non-linearity of one of the mounts is formed more precipitously than that of the other. In addition, when each elastic mount is provided with portions having large and small spring constants, the first and second elastic mounts can be incorporated in the subframe such that the directions of portions having large spring constant are different from each other. Thus, the degrees of freedom in the shape and incorporation of the elastic mount are substantially increased.

As a result, referring to a vertical spring constant the inside one of the first and second elastic mounts at the respective sides is formed so as to be smaller than the outside one to improve the vibration preventing performance.

Referring to a longitudinal spring constant, the first and second elastic mounts at the respective sides are respectively formed with portions having large and small spring constants or one elastic mount is formed with portions having large and small spring constants and the other elastic mount is formed to have a large spring constant.

When two elastic mounts at the respective sides are located in the front portion of the rotary axis of the wheel, both elastic mounts are incorporated such that an angle made by a portion of the outside mount having a large spring constant and a straight line extending longitudinally of the car body is smaller than that made by a portion of the inside mount having a large spring constant and the straight line extending longitudinally to ensure ride comfort and at the same time improve the controllability in the action of lateral force.

Referring to the longitudinal spring constant, when two elastic mounts at the respective sides are located in front of the rotary axis of the wheel, the spring constant of the elastic mount disposed at the outside is formed so as to be larger than that of the elastic mount disposed at an inside position to improve the controllability in the action of lateral force.

When two elastic mounts at the respective sides are located behind the rotary axis of the wheel, a similar effect is obtained from reversing said formation.

When the spring constant of at least one of the first and second elastic mounts at the respective sides is formed non-linearly, the position of the mount constituted from two elastic mounts is moved according to the amount of lateral force in the action of lateral force to vary the steering property.

When the suspension is provided with the strut bar, the strut bar is coupled with the mounting portion to which the inside elastic mount of two elastic mounts at the respective sides is attached, so that load applied from the strut bar is transmitted directly to the car body. Thus, the rigidity of the subframe can be reduced to provide a compact and light subframe.

BRIEF DESCRIPTION OF THE DRAWINGS

The other objects and features of the invention will become apparent from the following description of preferred embodiments of the invention with reference to the accompanying drawings, in which.

DESCRIPTION OF THE PREFERRED EMBODIMENTS

Figure 1:
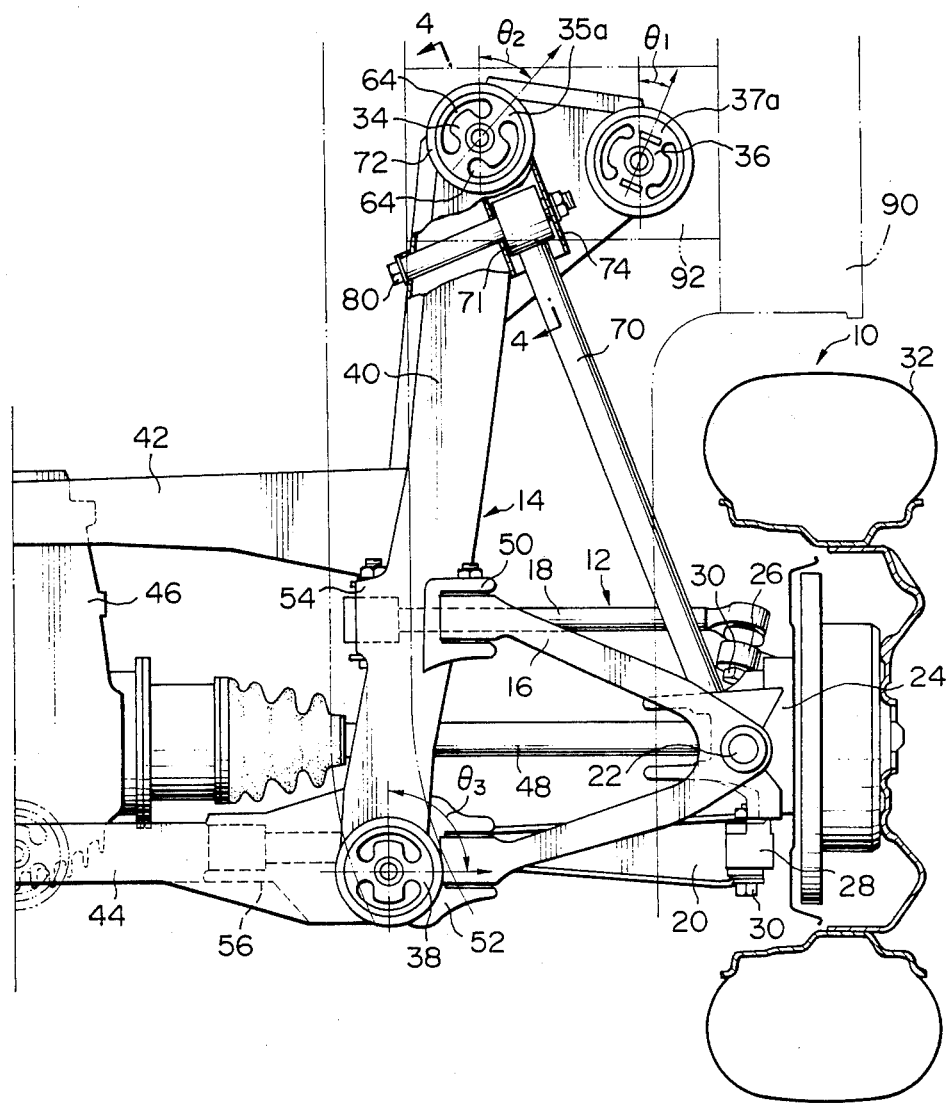
FIG. 1 is a plan view of a suspension showing a right half.

As shown in FIG. 1, a suspension 10 comprises a subframe 14 in which suspension arms 12 each supporting a wheel are respectively connected pivotably to the left and right sides (the right side is shown in FIG. 1).

The suspension arm 12 in the embodiment shown in the drawing is constituted from an upper arm 16, a first lower arm 18 and a second lower arm 20. The upper arm 16 has a planar shape formed V-shaped and diverging ends thereof are connected pivotably to the subframe 14 in the widthwise inside of a car body (not shown) as will be later described. An outer end of the upper arm 16 is coupled with a wheel carrier 24 through a ball joint 22.

Outer ends of the first and second lower arms 18,20 are coupled with brackets 26,28 provided on the wheel carrier 24 respectively through rubber bushings (not shown) by bolts 30 to swing about a horizontal axis. Inner ends of the first and second lower arms 18,20 are swingably coupled with the subframe 14 as will be later described.

Figure 2:
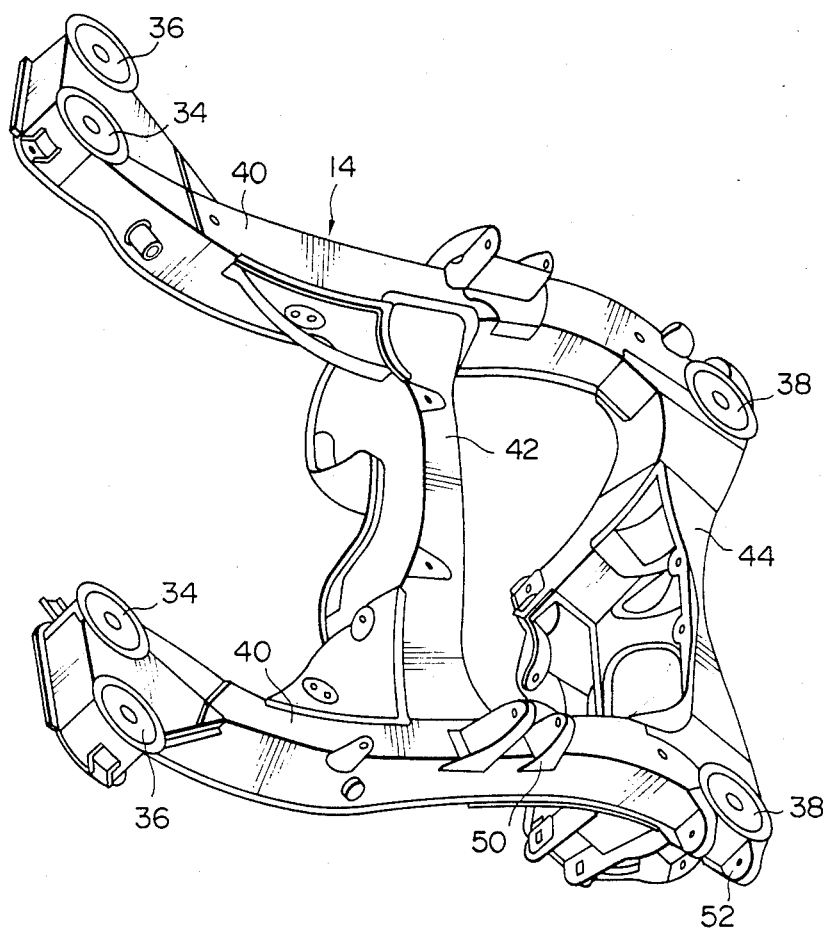
FIG. 2 is a perspective view showing a subframe.

As shown in FIG. 2, the subframe 14 is formed symmetrically about the center line extending longitudinally of the car body and coupled with the car body through two elastic mounts 34,36 disposed at each side in the front portion of a rotary axis of a wheel 32 mounted on the wheel carrier 24 and one elastic mount 38 disposed at each side in the rear portion of the rotary axis of the wheel 32, as will be later described.

In the embodiment shown, the subframe 14 is integrally formed of a pair of members 40 disposed longitudinally of the car body and a pair of support members 42,44 extending between the members 40. Said pair of members 40 are bent properly to avoid the interference with the car body. The support member 42 is welded to an approximately intermediate portion of each of the members 40, while the support member 44 is welded to a rear end of each of the members 40. A differential carrier 46 (FIG. 1) is supported by both support members through a structure known per se.

The two elastic mounts 34,36 are disposed at lateral interval at a front end of the member 40 and an inside elastic mount 34 is located in front of an outside elastic mount 36. On the other hand, the elastic mount 38 is disposed at a rear end of the member 40. In positions parted approximately in the longitudinal direction from a drive shaft 48 extending from the differential carrier 46 between said pair of support members 42,44 are provided with brackets 50,52 for the upper arm 16, a bracket 54 for the first lower arm 18 and a bracket 56 for the second lower arm 20, the respective arms being connected pivotably to the respective brackets by bolts through rubber bushings (not shown).

Figure 3A:
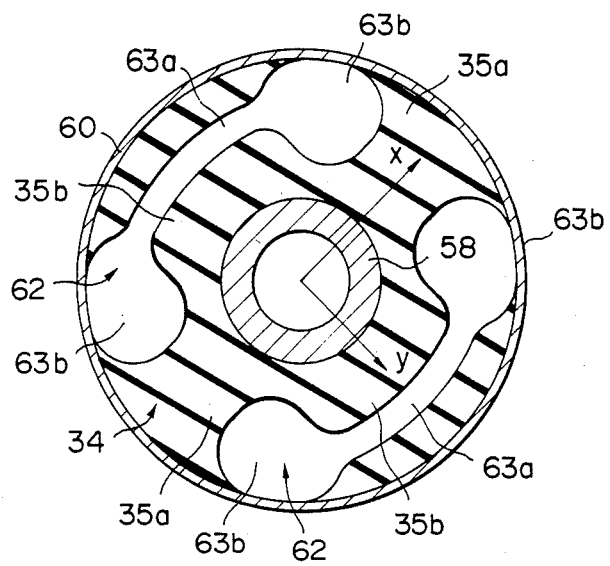
FIGS. 3(a), 3(b) are sectional views showing elastic mounts disposed in front of respective sides of the subframe.
Figure 3B:
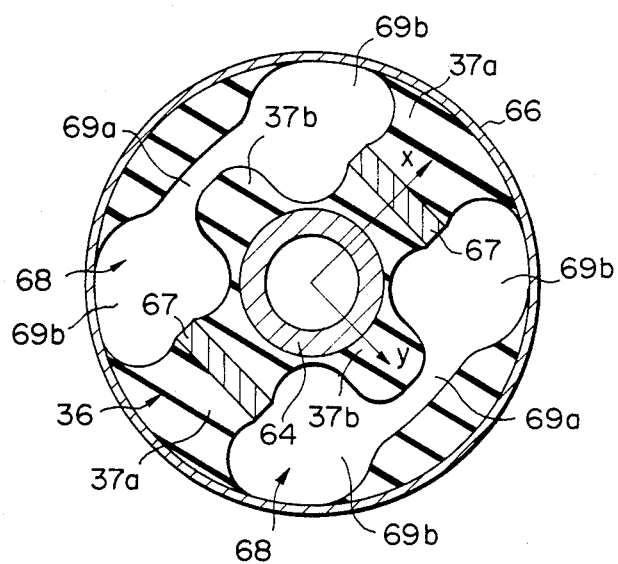

The respective elastic mounts are formed of rubber. Said two front elastic mounts 34,36 in the embodiment shown in FIG. 3 have three dimensional spring constants which differ from each other in the inside and outside ones.

The elastic mount 34 has an inner tube 58 bonded to an inner peripheral surface and an outer tube 60 bonded to an outer peripheral surface. A pair of hollowed holes 62 are provided symmetrically at both sides of the inner tube 58 so as to extend in an axial direction of the inner tube 58. The hollowed hole 62 consists of a portion 63a having a planar shape formed arcuately and an expanded portion 63b provided at both ends of the portion 63a. A portion 35a of the elastic mount 34 put between opposed expanded portions 63b is filled with rubber so that it is hard in a direction x, i.e., it has a large spring constant and a portion 35b in a direction y orthogonal to the direction x is soft due to the presence of the hollowed hole 62, i.e., the spring constant becomes small.

The elastic mount 36 has an inner tube 64 bonded to an inner peripheral surface and an outer tube 66 bonded to an outer peripheral surface. Further, the elastic mount 36 has a pair of iron plates 67 in portions 37a filled with rubber at both symmetrical side positions about the inner tube 64. A pair of hollowed holes 68 are provided symmetrically at both side positions of the inner tube 64 so as to extend in the axial direction of the inner tube 64. The followed hole 68 consists of a portion 69a having a planar shape formed arcuately and an expanded portion 69b provided at both ends of the portion 69a.

The circumferential length of the arcuate portion 69a of the hollowed hole 68 is shorter than that of the arcuate portion 63a of the hollowed hole 62. That is, the amount of rubber in a soft portion 37b of the elastic mount 36 is made smaller compared with a soft portion 35b of the elastic mount 34 and a space of the expanded portion 69b of the hollowed hole 68 in the elastic mount 36 is made larger by the reduced amount of said rubber.

Both elastic mounts 34,36 differ in operations according to the difference between the shapes or dimensions of hollowed holes 62,68 and the presence of the iron plate 67 as follows;

In the direction x, since the outside elastic mount 36 has the iron plate 67, the substantial length of rubber in a horizontal direction becomes shorter and the inside elastic mount 34 becomes softer.

In the direction y, while the spring constant is determined by the shear force of hard portions 35a,37a of the elastic mounts until the arcuate portions 63a,69a of the hollowed holes are flattened, the inside elastic mount 34 has the longer horizontal length of rubber as compared with the outside elastic mount 36, so that it is softer than the outside elastic mount 36. When the arcuate portions 63a,69a are flattened, the spring constant is raised by the compression of the portions 35b,37b in the direction y. In this case since the length of the portion 35b of the inside elastic mount 34 in the horizontal direction is larger than that of the outside portion 37b so that the inside mount 34 becomes harder.

In a direction z perpendicular to a paper surface, while the spring constant is determined by the shear of the hard portions 35a,37a in the direction x, the horizontal length of the portion 35a of the inside elastic mount 34 is longer than that of the outside portion 37a, so that the inside elastic mount 34 becomes softer.

The rear elastic mount 38 may have same construction as said elastic mount 34.

The outer tube of each elastic mount is press fitted into a hole provided in the subframe 14. In the press fitting, as shown in FIG. 1, the respective elastic mounts are located such that an angle $\theta_1$ made by the portion 37a having the large spring constant of the outside elastic mount 36 and a straight line extending in the longitudinal direction of the car body becomes smaller than an angle $\theta_2$ made by the portion 35a having the large spring constant of the inside elastic mount 34 and the straight line in the longitudinal direction of the car body and an angle $\theta_3$ made by the portion having the large spring constant of the rear elastic mount 38 and the straight line extending longitudinally is the largest. In the embodiment shown, $\theta_1$ is 30°, $\theta_2$ is 45° and $\theta_3$ is 90°.

The subframe 14 is coupled with the car body through the elastic mounts by bolts inserted into the inner tube of each elastic mount. Preferably the elastic mount 36 at the front outside is located to be opposed to a high rigidity portion of the car body, i.e., a rocker plate 90 or torque box 92.

Figure 4:
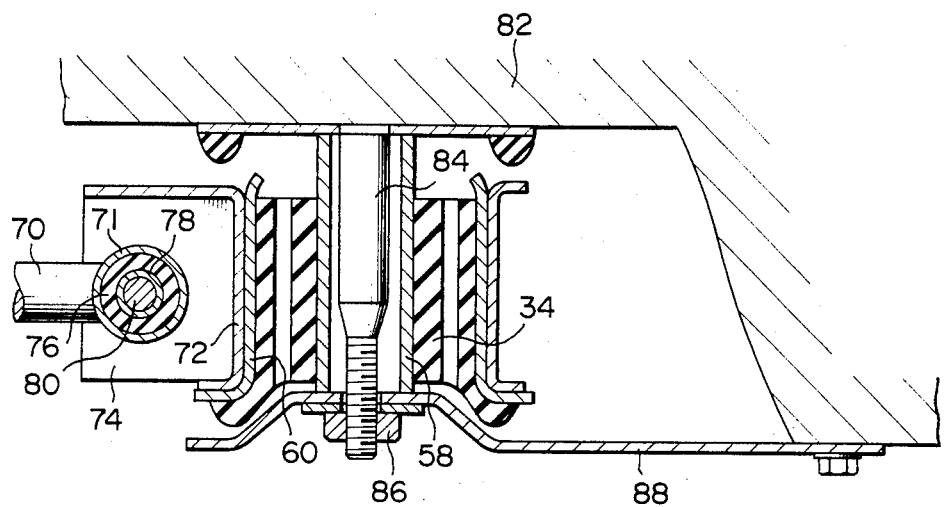
FIG. 4 is a sectional view taken along the line 4—4 in FIG. 1.

A strut bar 70 having a rear end pivotably connected to the wheel carrier 24 by a structure known per se is disposed obliquely to have the front end coupled with a mounting portion 72 to which the inside elastic mount 34 is attached. As shown in FIG. 4, a bracket 74 is provided so as to project from the mounting portion 72 of the subframe and an eye 71 provided on the end of the strut bar 70 is disposed in a gap made by the bracket 74. A rubber bushing 76 having a sleeve 78 is press fitted into the eye 71 and the strut bar 70 is pivotably connected to the bracket 74 by a bolt 80 extending through the sleeve 78.

The position in which the bracket 74 is mounted is determined such that the extension of an axis of the strut bar 70 coincides with an axis of the elastic mount 34 as viewed in plan shown by FIG. 1 and the extension of the axis of the strut bar 70 crosses the central portion of the vertical length of the elastic mount 34 as viewed in a front shown by FIG. 4. As a result, when the elastic mount 34 is coupled with the car body 82 by a stud bolt 84 fixed in the car body 82 and a nut 86, the load applied from the strut bar 70 is transmitted to the car body 82 through the mounting portion 72, elastic mount 34 and bolt 84 without generating any moment in the mounting portion 72 and thus the subframe 14 or with generating only a slight moment. Thus, the subframe 14 has a small rigidity characteristic and is lightened. As shown in the drawing, when the stud bolt 84 is of a cantilever type, a reinforcing plate 88 is preferably spanned between the car body 82 and the stud bolt 84 to reinforce the stud bolt 82.

In the above mentioned embodiment, two elastic mounts 34,36 are disposed at the respecitve sides of the subframe 14 in front of the rotary axis of the wheel and one elastic mount 38 is disposed at the respective sides of the subframe 14 behind said axis of the wheel. Alternatively, when the suspension 10 is particularly used for the front wheels, two elastic mounts 34,36 can be disposed at the respective sides of the subframe 14 behind the rotary axis of the wheel and one elastic mount 38 can be disposed at the respective sides of the subframe in front of said rotary axis.

Figure 9:
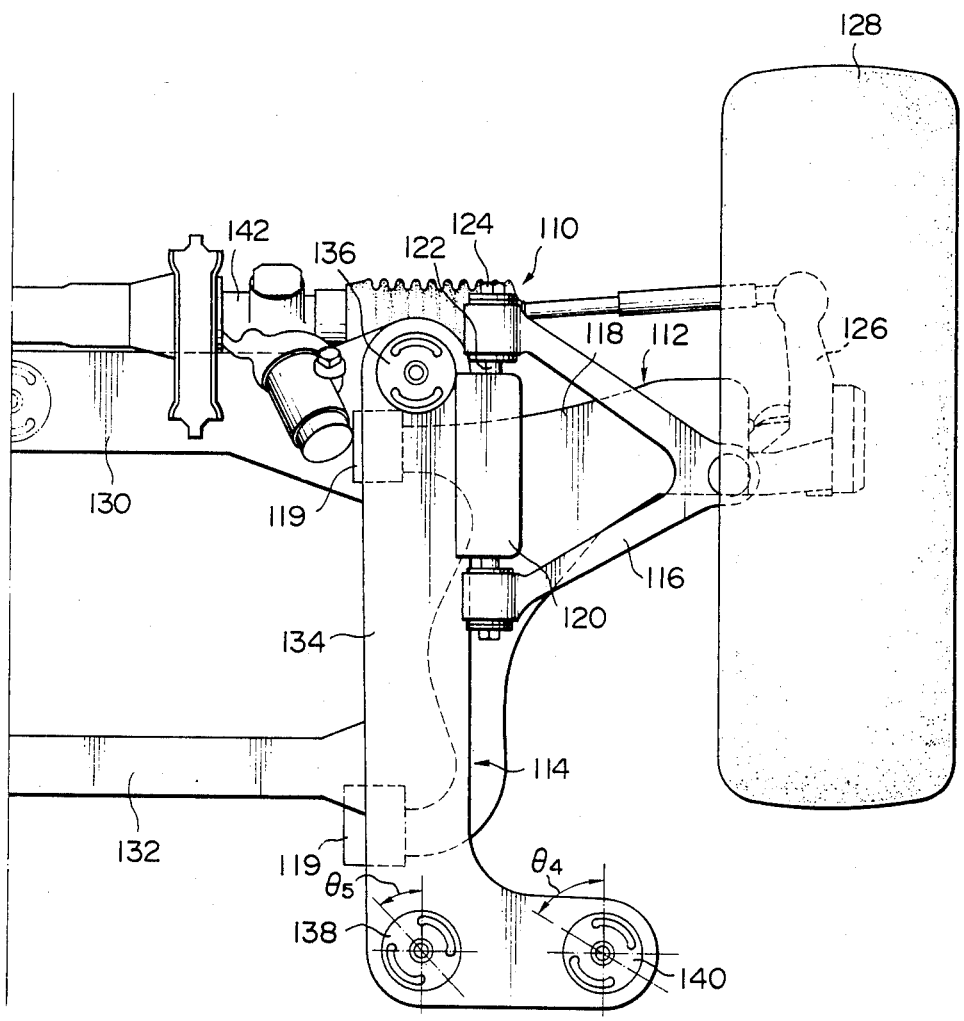
FIG. 9 is a plan view showing the right half of a different embodiment of the suspension.

A suspension 110 shown in FIG. 9 is one for suspending front wheels and comprise a subframe 114 having suspension arms 112 pivotably connected to the left and right sides respectively.

The suspension arm 112 is constituted from an upper arm 116 having the substantially same shape as that of said embodiment and a lower arm 118 formed genrally L-shaped. The upper arm 116 is swingably connected on a bracket 120 provided on the subframe 114 by a bolt 122 and a nut 124. The lower arm 118 is pivotably connected to the subframe 114 at two inner ends spaced from each other longitudinally by a coupling structure known per se. A steering knuckle 126 is connected on respective outer ends of the upper and lower arms 116,118 by ball joints (not shown) and a front wheel 128 is supported by the steering knuckle 126. Since the lower arm 118 is L-shaped, the forward and backward movement of the front wheel 128 is restricted by the lower arm 118 so that a strut bar may be dispensed with.

The subframe 114 is constituted from a pair of cross members 130,132 disposed in front and the rear and a pair of side members 134 welded respectively to the cross members 130,132. The subframe 114 is formed symmetrically about the center line extending in the longitudinal direction of the car body. The subframe 114 is coupled with the car body through one elastic mount 136 disposed at the respective sides in front of an rotary axis of the front wheel 128 and two elastic mounts 138,140 disposed at the respective sides in rear of the rotary axis. On the subframe 114 is mounted a gear box 142 of a steering gear.

The elastic mount 136 has high lateral rigidity and low longitudinal rigidity formed and disposed similarly to the elastic mount 38. The rear elastic mounts 138,140 are constructed similarly to the elastic mount 34. The outer elastic mount 140 may be constituted similarly to the elastic mount 36. However, when the elastic mounts 138,140 are press fitted into the subframe 114, both elastic mounts 138,140 are positioned so as to direct the hard portions in the different directions. That is, angles $\theta_4, \theta_5$ made by the hard portions of the elastic mounts 140,138 and the straight line extending in the longitudinal direction of the car body respectively are measured counterclockwise whereas the angles $\theta_1, \theta_2$ made by the respective hard portions of the elastic mounts 36,34 and the straight line extending in the longitudinal direction of the car body are measured clockwise. Further, the angle $\theta_4$ is larger than the angle $\theta_5$. In the embodiment shown, $\theta_4$ is 60° and $\theta_5$ is 45°.

The elastic mount 38 or 136 in the rear of or front of the rotary axis of the wheel is disposed at the respective sides of the subframe 14 or the subframe 114. Instead, only one elastic mount as shown by a phantom line in FIGS. 1 and 9, may be disposed in a laterably central position of the member 44 or the member 130. In this case, the subframe is coupled with the car body through total five elastic mounts.

Two elastic mounts disposed at the respective sides of the subframe have the spring constants different from each other in the three dimensional direction. However, for example the spring constant may be made different only in the direction x, y, z or in any two directions.

While the strut bar 70 has one end coupled with the wheel carrier 24, it may instead be coupled with the suspension arm 12, i.e., one of the lower arms 18,20 or upper arm 16. Also, the suspension arm 12 is formed of only a single arm in the case of Macpherson Strut Type suspension.

Operation and effect caused by the fact that the vertical spring constant of the outside elastic mount 36 of two elastic mounts 34,36 disposed at the respective sides of the subframe 14 is larger than that of the inside elastic mount 34:

The outside elastic mount 36 is coupled in proximity to the rocker panel 90 or torque box 92 (FIG. 1) of the car body having large rigidity and low sensitivity of vibration. Since the vertical spring constant of the outside elastic mount 36 is larger than that of the inside one, the outside elastic mount 36 can share more of the load. As a result, when a vibration is transmitted from the differential gear 46 to the subframe 14, more load is transmitted through the elastic mount 36 to the portion of the car body having low sensitivity to eventually reduce the vertical vibration transmitted sensibly to the car body.

Figure 5:
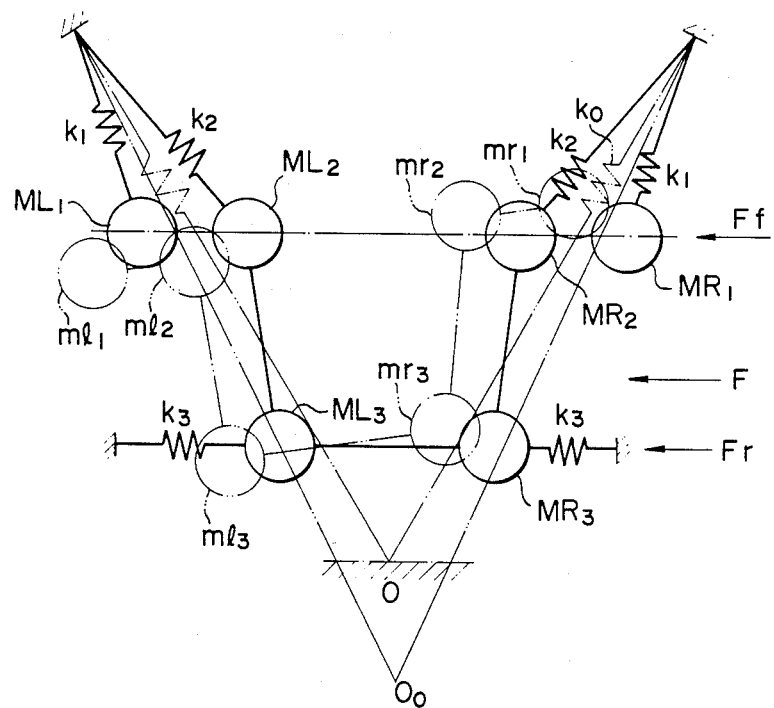
FIGS. 5 and 6 are explanatory illustrations showing operation of the elastic mount.

Operation and effect caused by the fact that the angle $\theta_1$ (FIG. 1) made by the portion 37a having large spring constant of the outside elastic mount 36 of two elastic mounts 34,36 disposed at the respective sides of the subframe 14 and the straight line extending in the longitudinal direction of the car body is smaller than the angle $\theta_2$ made by the portion 35a having large spring constant of the inside elastic mount 34 and the straight line extending longitudinally:

As shown in FIG. 5, it is assumed that the spring constants of hard portions of the elastic mounts 36,34 and 38 are $k_1, k_2$ and $k_3$, the composite spring constant of $k_1, k_2$ is $k_o$ and the interseciton of the directions of left and right $k_o$ is O. When the lateral force F caused by turning acts of the wheel, the front elastic mounts $MR_1$, $MR_2$, $ML_1$ and $ML_2$ receive the front shared lateral force Ff, tend to rotate about O and move respectively to $mr_1$, $mr_2, ml_1$ and $ml_2$. The rear elastic mounts $MR_3, ML_3$ receive the rear shared lateral force Fr to move $mr_3, ml_3$. In this case, when $k_2$ is less than $k_1$ even if the sum of $k_1$ and $k_2$ is constant, the intersection O of $k_o$ moves to $O_o$. This means that an amount of lateral movement of each of the front elastic mounts increases, and the suspension has the tendency to under-steer and improves controllability. Since the sum of $k_1$ and $k_2$ is then constant, the increase in the longitudinal compliance is extremely small and the riding comfort is not substantially degraded.

When the longitudinal spring constant of the outside elastic mount 36 is larger than that of the inside elastic mount 34, i.e., $k_2 < k_1$, the intersection O of $k_o$ can be moved to $O_o$ and the lateral movement of each of the front elastic mounts can be ensured. As a result, the suspension has the tendency understeer and improves controllability.

Figure 6:
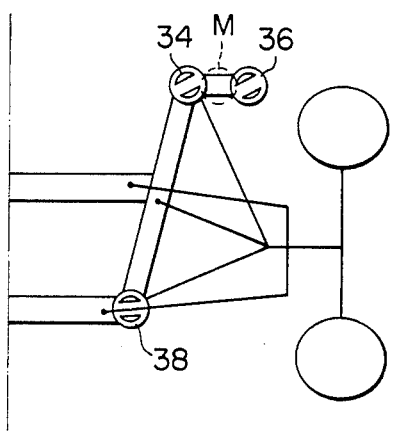
Figure 7:
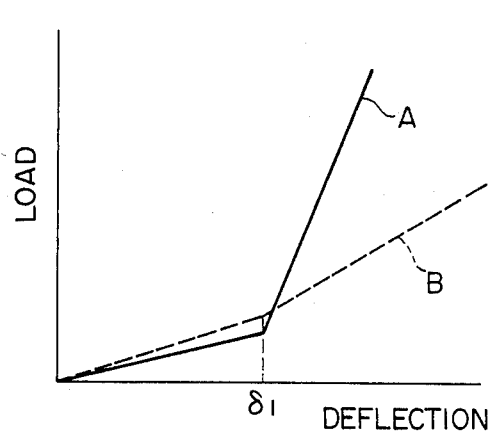
FIG. 7 is a characteristic diagram showing the relationship between deflection and load.
Figure 8:
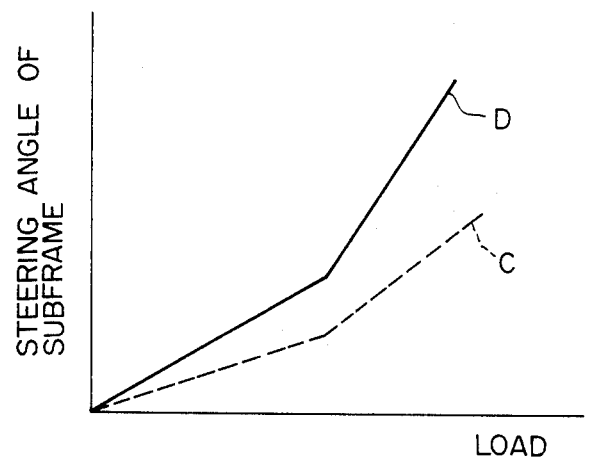
FIG. 8 is a characteristic diagram showing the relationship between the load and a steering angle of the subframe.

Operation and effect caused by the fact that the longitudinal spring constant of at least one of two elastic mounts 34,36 disposed at the respective sides of the subframe 14 is non-linear:

When the spring property of the elastic mount 34 and the spring property of the elastic mount 36 are made non-linear respectively as shown by A and B in FIG. 7, i.e., when the tendency of increasing load until deflection $\delta_1$ is reached and that after the deflection is reached are given to different properties, the load shared will differ between the elastic mounts 34,36 after the deflection $\delta_1$ is reached. As a result, the position of supposed mount M (FIG. 6), which is one elastic mount substituted for both elastic mounts, moves according to the amount of deflection $\delta$. Thus, as shown in FIG. 8, while the subframe 14 in conventional four or three mount supports has an angle C displaced by load, an angle of the subframe in the present invention changes abruptly as shown by D so that so-called steering property can be sharply changed.

Since the steering property can be sharply changed, the steering angle of the wheel can be set as it is designed according to the amount of received lateral force to improve sharply the performance from turning with small lateral acceleration to that with a large limit of lateral acceleration.

Also, the degree in which the inside elastic mount 34 becomes non-linear is larger than that in which the outside elastic mount 36 becomes non-linear and the strut bar 70 is coupled with the mounting portion 72 of the inside elastic mount 34, so that an effect of transmitting large load generated by riding on a overstone directly to the car body is increased.

Obviously, numerous modifications and variations of the present invention are possible in light of the above teachings. It is therefore to be understood that within the scope of the appended claims, the invention may be practiced otherwise than as specifically described herein.

What is claimed is:

1. A suspension of a vehicle comprising:
a set of suspension arms each supporting a wheel;
a subframe pivotably connected on its left and right sides with said respective suspension arms, the subframe having on each side thereof first and second portions located forward and rearward of a rotary axis of said wheel; and
a plurality of elastic mounts,
wherein said subframe is coupled on each side thereof with a car body through at least two of said elastic mounts disposed at lateral intervals in one of said first and second portions and at least one of said elastic mounts is disposed in the other of said first and second portions, and wherein at least two of the spring constants in the longitudinal, lateral and vertical directions of the inside elastic mount of said two elastic mounts are different from that corresponding to the longitudinal, lateral and vertical directions of the outside elastic mount.

2. A suspension of a vehicle comprising:
a set of suspension arms each supporting a wheel;
a subframe pivotably connected on its left and right sides with said respective suspension arms, the subframe having on its each side first and second portions forward and rearward of a rotary axis of said wheel and on its center between both sides in one of the front and rear of said rotary axis a third portion; and
a plurality of elastic mounts,
wherein said subframe is coupled on each side thereof with a car body through at least two of said elastic mounts disposed at lateral inteval in one of said first and second portions which is located in the other of the front and rear of the rotary axis, said subframe being further coupled at a lateral center thereof with the car body through at least one of said elastic mounts disposed in the third portion, and wherein at least two of the spring constants in the longitudinal, lateral and vertical directions of the inside elastic mount of said two elastic mounts are different from that corresponding in the longitudinal, lateral and vertical directions of the outside elastic mount.

3. A suspension as claimed in claim 1 or 2, wherein the vertical spring constant of each of said two elastic mounts disposed on said each side coprises one of said at least two constants and the vertical spring constant of the outside elastic mount is larger than that of the inside elastic mount.

4. A suspension as claimed in claim 1 or 2, wherein said two elastic mounts disposed on each said side are located in front of said rotary axis of the wheel, and wherein the longitudinal spring constant of each of said two elastic mounts comprises one of said at least two spring constants and the longitudinal spring constant of the outside elastic mount is larger than that of the inside elastic mount.

5. A suspension as claimed in claim 1 or 2, wherein the longitudinal spring constant of at least one of said two elastic mounts disposed on said each side is non-linear.

6. A suspension as claimed in claim 1 or 2, wherein said two elastic mounts disposed on said each side are located in the rear of said rotary axis of the wheel, and wherein the longitudinal spring constant of each of said two elastic mounts comprises one of said at least two spring constants and the longitudinal spring constant of the outside elastic mount is smaller than that of the inside elastic mount.

7. A suspension of a vehicle comprising:
a set of suspension arms each supporting a wheel;
a subframe pivotably connected on left and right sides thereof with said respective suspension arms, the subframe having on its each side first and second portions provided respectively forward and rearward of a rotary axis of said wheel; and
a plurality of elastic mounts,
wherein said subframe is coupled on each side thereof with a car body through at least two of said elastic mounts disposed at lateral intervals in the first portion, said two elastic mounts having respectively large longitudinal spring constant portions, wherein an angle between the large spring contant portion of an outside elastic mount and a straight line extending in the longitudinal direction of the car body is larger than that between the large spring constant portion of an inside elastic mount and said straight line, and wherein said subframe is further coupled on each side thereof with a car body through at least one of said elastic mounts disposed in the first portion.

8. A suspension of a vehicle comprising:
a set of suspension arms each supporting a wheel;
a subframe pivotably connected on its left and right sides with said respective suspension arms, the subframe having on each side first and second portions provided respectively forward and rearward of a rotary axis of said wheel and on its center between both sides in the front of the rotary axis a third portion; and
a plurality of elastic mounts,
wherein said subframe is coupled on each side thereof with a car body through at least two of said elastic mounts disposed at lateral intervals in the second portion, said two elastic mounts having respectively large longitudinal spring constant portions, wherein an angle between the large spring contant portion of an outside elastic mount and a straight line extending in the longitudinal direction of the car body is larger than that between the large spring constant portion of an inside elastic mount and said straight line, and wherein said subframe is further coupled on a lateral center thereof with the car body through at least one of said elastic mounts disposed in the third portion.

9. A suspension of a vehicle comprising:
a set of suspension arms each supporting a wheel carrier;
a subframe pivotably connected on its left and right sides with said respective suspension arms, the subframe having on its each side portions forward and rearward of a rotary axis of a wheel supported by said wheel carrier;

a strut bar disposed on each side of a car body and connected at one end thereof with any of said suspension arm and carrier;

a plurality of elastic mounts, wherein said subframe is coupled on each side thereof with a car body through at least two of said elastic mounts disposed at lateral interval in one of said portions and at least one elastic mount disposed in the other of said portions, and wherein the other end of said strut bar is connected with a portion to which is attached an inside elastic mount of said two elastic mounts disposed on said each side.

10. A suspension of a vehicle comprising:

a set of suspension arms each supporting a wheel carrier;

a subframe pivotably connected on its left and right sides with said respective suspension arms, the subframe having on its each side portions forward and rearward of a rotary axis of a wheel supported by said wheel carrier;

a strut bar disposed on each side of a car body and connected at one end thereof with any of said suspension arm and carrier;

a plurality of elastic mounts, wherein said subframe is coupled on each side thereof with a car body through at least two of said elastic mounts disposed at lateral interval in one of said portions, and wherein said subframe is further coupled at a lateral center thereof with the car body through at least one elastic mount disposed in the other of said portions, and wherein the other end of said strut bar is connected with a portion to which is attached an inside elastic mount of said two elastic mounts disposed on said each side.

11. A suspension as claimed in claim 9 or 10, wherein said two elastic mounts disposed on said each side are located in front portion of said rotary axis of the wheel, and wherein the spring constants in the respective longitudinal, lateral and vertical directions of the inside elastic mount of said two elastic mounts are smaller than those in the respective longitudinal, lateral and vertical directions of the outside elastic mount.

12. A suspension of a vehicle comprising:

a set of suspension arms each supporting a wheel;

a subframe pivotably connected on its left and right sides with said respective suspension arms, the subframe having on each side first and second portions provided respectively forward and rearward of a rotary axis of said wheel; and a plurality of elastic mounts, wherein said subframe is coupled on each side thereof with a car body through at least two of said elastic mounts disposed at lateral interval in one of said first and second portions, said two elastic mounts having respectively large longitudinal spring constant portions, and wherein an angle between the large spring contant portion of an outside elastic mount and a straight line extending in the longitudinal direction of the car body is different from that between the large spring constant portion of an inside elastic mount and said straight line, and wherein said subframe is further coupled on each side thereof with a car body through at least one of said elastic mounts disposed in the other of the first and second portions.

13. A suspension of a vehicle comprising:

a set of suspension arms each supporting a wheel;

a subframe pivotably connected on left and right sides thereof with said respective suspension arms, the subframe having on its each side first and second portions provided respectively forward and rearward of a rotary axis of said wheel and on its center between both sides in one of the front and rear of the rotary axis a third portion; and a plurality of elastic mounts, wherein said subframe is coupled on each side thereof with a car body through at least two of said elastic mounts disposed at lateral interval in one of said first and second portions which is located in the other of the front and rear to the rotary axis, said two elastic mounts having respectively large longitudinal spring constant portions, wherein an angle between the large spring contant portion of an outside elastic mount and a straight line extending in the longitudinal direction of the car body is different from that between the large spring constant portion of an inside elastic mount and said straight line, and wherein said subframe is further coupled on each side thereof with a car body through at least one of said elastic mounts disposed in the third portion.

14. A suspension of a vehicle comprising:

a set of suspension arms each supporting a wheel;

a subframe pivotably connected on left and right sides thereof with said respective suspension arms, the subframe having on its each side first and second portions provided respectively forward and rearward of a rotary axis of said wheel; and a plurality of elastic mounts, wherein said subframe is coupled on each side thereof with a car body through at least two of said elastic mounts disposed at lateral interval in the first portion, said two elastic mounts having respectively large longitudinal spring constant portions, and wherein an angle between the large spring contant portion of an outside elastic mount and a straight line extending in the longitudinal direction of the car body is smaller than that between the large spring constant portion of an inside elastic mount and said straight line, and wherein said subframe is further coupled on each side thereof with a car body through at least one of said elastic mounts disposed in the second portion.

15. A suspension of a vehicle comprising:

a set of suspension arms each supporting a wheel;

a subframe pivotably connected on left and right sides thereof with said respective suspension arms, the subframe having on its each side first and second portions provided respectively forward and rearward of a rotary axis of said wheel and on a center portion thereof between both sides in the rear of the rotary axis a third portion; and a plurality of elastic mounts, wherein said subframe is coupled on each side thereof with a car body through at least two of said elastic mounts disposed at lateral interval in the first portion, said two elastic mounts having respectively large longitudinal spring constant portions, and wherein an angle between the large spring contant portion of an outside elastic mount and a straight line extending in the longitudinal direction of the car body is smaller than that between the large spring constant portion of an inside elastic mount and said straight line, and wherein said subframe is further coupled on a lateral center thereof with the car body through at least one of said elastic mounts disposed in the third portion.

* * * * *